(12) United States Patent
Shriraghav et al.

(10) Patent No.: US 7,707,207 B2
(45) Date of Patent: Apr. 27, 2010

(54) ROBUST CARDINALITY AND COST ESTIMATION FOR SKYLINE OPERATOR

(75) Inventors: Kaushik Shriraghav, Bellevue, WA (US); Surajit Chaudhuri, Redmond, WA (US); Nilesh N. Dalvi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 11/357,665

(22) Filed: Feb. 17, 2006

(65) Prior Publication Data

US 2007/0198439 A1    Aug. 23, 2007

(51) Int. Cl.
*G06F 17/30* (2006.01)
*G06F 15/16* (2006.01)

(52) U.S. Cl. .................... 707/720; 707/754
(58) Field of Classification Search ............ 707/2
See application file for complete search history.

(56) References Cited

U.S. PATENT DOCUMENTS

| 2004/0181519 A1* | 9/2004 | Anwar .................... 707/3 |
| 2005/0187849 A1* | 8/2005 | Bollapragada et al. ..... 705/36 |

OTHER PUBLICATIONS

S. Börzsönyi, D. Kossmann and K. Stocker. The Skyline Operator. Proceedings of the 17th International Conference of Data Engineering, IEEE Computer Society, Heidelberg, Germany, Apr. 2-6, 2001, pp. 421-430.*
J. Chomicki, P. Godfrey, J. Gryz and D. Liang, Skyline with Presorting. Proceedings of the 19th International Conference on Data Engineering,IEEE Computer Society, Banglore, India, Mar. 5-8, 2003, pp. 717-719.*
P. Godfrey, Skyline Cardinality for Relational Processing. In: Foundations of Information and Knowledge Systems, LNCS 2942, Springer-Verlag, Mar. 6, 2004, pp. 78-97.*
D. Papadias, Y. Tao, G. Fu and B. Seeger. Progressive Skyline Computation in Database Systems. ACM Transactions on Database Systems, vol. 30, No. 1, Mar. 2005, pp. 41-82, but the paper was available in 2004.*
D. Papadias, Y. Tao, G. Fu and B. Seeger. An Optimal and Progressive Algorithm for Skyline Queries. Proceedings of the 2003 ACM SIGMOD International Conference on Management of Data, Jun. 9-12, 2003, San Diego, California, USA, pp. 467-478.*
S. Chaudhuri, N. Dalvi, and Raghav Kaushik. Robust Cardinality and Cost Estimation for Skyline Operator. Proceedings of the 22th International Conference of Data Engineering, IEEE Computer Society, Atlanta, Georgia, USA, Apr. 3-7, 2006, 10 pages.*

(Continued)

*Primary Examiner*—Greta L Robinson
*Assistant Examiner*—Brian E Weinrich
(74) *Attorney, Agent, or Firm*—Lee & Hayes, PLLC

(57) ABSTRACT

The claimed subject matter relates to incorporating a skyline operator within a relational database engine, and more particularly to a database engine that utilizes novel techniques to determine the lowest cost of generating the skyline produced by the skyline operator. The database engine receives queries and associated preferences and, based on a cardinality estimate and a cost estimate, an appropriate skyline generating technique is utilized to produce a skyline representative of the received queries and its associated preferences.

20 Claims, 12 Drawing Sheets

OTHER PUBLICATIONS

Chaudhuri, et al. "Robust Cardinality and Cost Estimation for Skyline Operator" (2006)Proceedings of the 22nd International Conference on Data Engineering (ICDE'06), 10 pages.

Bentley, et al. "On the Average Number of Maxima in a Set of Vectors and Applications" ACM, 25(4) (1998) pp. 536-543.

Chan, et al. "Stratified Computation of Skylines with Partially-Ordered Domains" Proceedings of the 2005 ACM SIGMOD international conference on Management of data (2005) pp. 203-214.

Godfrey. "Skyline Cardinality for Relational Processing" In Foundations of Information and Knowledge Systems (2004) 20 pages.

Graefe. "The Cascades Framework for Query Optimization" IEEE Data Eng. Bull. 18(3) (1995) pp. 19-29.

Chomicki, et al. "Skyline with Presorting" Proceedings of the 19th International Conference on Data Engineering, Banglore, India (2003) 3 pages.

Kiebling, et al. "Preference SQL-Design, Implementation, Experiences" VLDB (2002) pp. 990-1001.

Kossman, et al. "Shooting Stars in the Sky: An Online Algorithm for Skyline Queries" VLDB (2002) 12 pages.

Kung, et al. "On Finding the Maxima of a Set of Vectors" ACM 22(4) (1975) pp. 469-476.

Lee, et al. "Multi-dimensional Selectivity Estimation Using Compressed Histogram Information" SIGMOD (1999) pp. 205-214.

Lipton, et al. "Query Size Estimation by Adaptive Sampling" PODS (1990) pp. 40-46.

Lipton, et al. "Practical Selectivity Estimation through Adaptive Sampling" Proceedings of the 1990 ACM SIGMOD International Conference on Management of Data, Atlantic City, New Jersey (published May 7, 1992) pp. 1-11.

Papadias, et al. "An Optimal and Progressive Algorithm for Skyline Queries" Proceedings of the 2003 ACM SIGMOD International Conference on Management of Data (2003) pp. 467-478.

Poosala, et al. "Selectivity Estimation Without the Attribute Value Independence Assumption" Proceedings of the 23rd International Conference on Very Large Data Bases (1997) pp. 486-495.

Borzsonyi, et al. "The Skyline Operator" Proceedings of the 17th International Conference of data Engineering, Heidelber, Germany (2001) 20 pages.

Papadias, et al. "Progressive Skyline Computation in Database Systems" ACM Transactions on Database Systems vol. 30 No.1 (2005) pp. 41-82.

* cited by examiner

ROBUST CARDINALITY AND COST ESTIMATION FOR SKYLINE OPERATOR

BACKGROUND

Databases are ubiquitous—most people during their daily lives interact, sometimes unwittingly, with databases. Generally, corporations, research laboratories, educational institutions, small businesses and government organizations employ at least one database and some entities utilize several databases. Common examples of databases include: human resource databases, machine parts databases, product inventory databases, production schedule databases, pay disbursement databases, insurance claim management databases, medical treatment and patient history databases, vehicle licensing databases, etc. It is thus safe to state that currently there exists a multitude of database types and implementations, but despite the multifariousness of database type and implementation most if not all extant databases operate and function on similar principals.

The first databases emerged in the 1960s and were applied to large enterprise wide problems, such as for example airline reservation systems. At that time computers were monumental in scale and expensive to operate and maintain. Typically, only large corporations, research and development establishments, educational institutions and government agencies could afford to own and operate computers, let alone run a single database system. However, as computing power increased and the costs associated with operating and maintaining computers decreased many smaller organizations have been able to justify the expenditure necessary to acquire computers, and commensurately the ability to acquire data and support larger collections of databases. Thus, advances in computer technology (e.g., microprocessor speed, memory capacity, data transfer bandwidth, software functionality, and the like) have generally contributed to increased computer application utilization in various industries. Ever more powerful server systems, which are often configured as an array of servers, are commonly provided to service requests originating from external sources such as the World Wide Web, for example.

Nevertheless, to truly appreciate what a database is, it may be constructive to comprehend what data is, the types of information that can constitute data and the uses to which data can be put. It is commonly understood that data can be a collection of information that can be utilized as a basis for reasoning, calculation, processing, etc. Further, data can be acquired in a plethora of manners and can be put to a multitude of uses. Common examples of data that can be acquired include names of people, places and things, descriptions of people, places and things, dates and times of events, descriptions and prices of things, business information, images, video, audio, production specifications, inventory information, meteorological information, historical stock market quotes, pharmacological information, banking information, vehicle registration information, personal medical information, and the like. Some uses that this acquired data can be put to include, meteorological forecasting (e.g., tracking winter storms, hurricanes, typhoons, tornados, . . . ), and generation of economic forecasts (e.g., consumer confidence indexes, stock market prognostications, . . . ) to name but a few.

Consequently, as the amount of available electronic data grows, it has become more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired items of data, for example.

Usually, data within a database is organized via one or more tables where these tables are arranged as an array of rows and columns. Further, such tables can comprise a set of records, wherein each record includes a set of fields. Records are commonly indexed as rows within a table and the record fields are typically indexed as columns, such that a row/column pair of indices can reference a particular datum within a table. For example, a row may store a complete data record relating to a sales transaction, a person, a vehicle, or a project. Similarly, the columns of a table can define discrete portions of the rows that have the same general data format, wherein the columns can define fields of the records.

Each individual piece of data, standing alone, is generally not very informative or useful. Consequently, database applications are utilized to make data more useful by aiding users to organize and process data stored within databases. Database applications allow users to compare, search, sort, order, merge, separate and integrate disparate items of data, so that meaningful information can be generated from the data. However, despite the manifold benefits associated with the aforementioned database applications it has been found, in the context of database searches, for example, that such searches can often return empty answers when all the search requirements remain unfulfilled. This is particularly evident where a user wishes to utilize a database to search for a particular item based on a set of preferences, for example, the best flight, the most perfect house, the most ideal used car, or the most optimally located hotel, given a set of criteria. Until recently, traditional database engines or query languages had not supported searches based on preferences, or if there were support such searches were rudimentary and/or cumbersome to implement. Thus in order to satisfy the need for searches that include preferences a skyline operator has been introduced as an extension to SQL (Structured Query Language) to implement queries with associated preferences. This newly introduced skyline operator in effect takes a set of preferences as input and returns only those results for which there is no other result that is better with respect to all other input preferences.

While the skyline operator does not necessarily add to the expressive power of SQL, implementation of the skyline operator without being cognizant of the properties of the operator can be inordinately expensive. Thus, having introduced the skyline operator into SQL, it has now been noted that it is not sufficient to merely have the skyline operator as the top-most operator in an operator tree, and further it has been observed that in some instances, the interaction between the skyline operator with other operators can result in significant performance benefits. Additionally, it has latterly been observed that there are properties associated with the skyline operator that distinguishes it markedly from traditional operators, such as, for example, the selection operator. An example of one distinction that can be drawn between the skyline operator and the selection operator, for instance, is that unlike utilization of the selection operator where adding new selections only decreases cardinality, adding new preferences can increase the skyline cardinality of the operator.

Thus, while the skyline operator can be expressed and implemented in SQL, it has nevertheless been widely recognized that the most efficient and efficacious implementation requires incorporating the skyline operator inside the database engine itself. However, introduction of such an operator into the database engine requires that, amongst other factors, the cardinality and the cost associated with utilization of the skyline operator be optimized prior to execution of the preference queries.

SUMMARY

The following presents a simplified summary of the claimed subject matter in order to provide a basic understanding of some aspects of the claimed subject matter. This summary is not an extensive overview of the claimed subject matter. It is not intended to identify key/critical elements of the claimed subject matter or to delineate the scope of the claimed subject matter. Its sole purpose is to present some concepts of the claimed subject matter in a simplified form as a prelude to the more detailed description that is presented later.

The subject matter as disclosed and claimed herein relates to incorporating a skyline operator within a relational database engine. The skyline operator included in the database engine allows the database engine to implement preference search queries that hitherto had been unsupported in many versions of SQL or other database query language. The skyline operator in effect receives a set of preferences associated with a search and returns only those items for which there are no other items that have as good or better result in relation to the preferences provided.

In accordance with one aspect of the claimed subject matter, a database engine component that facilitates the generation of dominant or skyline results includes an interface component that receives search queries associated with preference operators. The interface component communicates the received search query and the associated preference parameters to an optimization component that can optimize the search query in terms of at least cardinality and cost to thereby reduce the amount of time that is necessary to satisfy the received search query in relation to its associated preferences.

The optimization component can include a cardinality estimation component that estimates the cardinality of a skyline that could be generated by the skyline operator incorporated within the database engine, as well as a cost estimation component that determines the costs associated with generating the skyline through the use of one or more exemplary skyline generating techniques, such as, for example, the Block-Nested-Loop algorithm, Nearest-Neighbor, Bitmap, etc. The determination made by the cost estimation component is based at least in part on the results generated by the cardinality estimation component.

The cardinality estimation component in determining a projected cardinality for a submitted search query and its associated preferences or attributes, determines whether the attributes associated with the search query are numeric or predicate preferences in character, and further determines whether tuples required to satisfy the query and generate the skyline are independent of one another. The cardinality component subsequently utilizes various techniques (e.g., sampling, histograms), approximations and formulae to provide an estimation of the cardinality of the projected skyline that the skyline operator might generate. The result of the cardinality estimation is then conveyed to and utilized by a cost estimation component that utilizes the cardinality estimation to associate a cost for generating the skyline using the one or more exemplary skyline generating techniques. The database engine thus utilizes the result of this cost estimation to select which of the plethora of techniques available will yield the most cost efficient method of generating the resultant skyline to satisfy the submitted query and its associated preferences.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and the claimed subject matter is intended to include all such aspects and their equivalents. Other advantages and novel features of the claimed subject matter will become apparent from the following detailed description of the claimed subject matter when considered in conjunction with the drawings.

DETAILED DESCRIPTION

Figure 1:
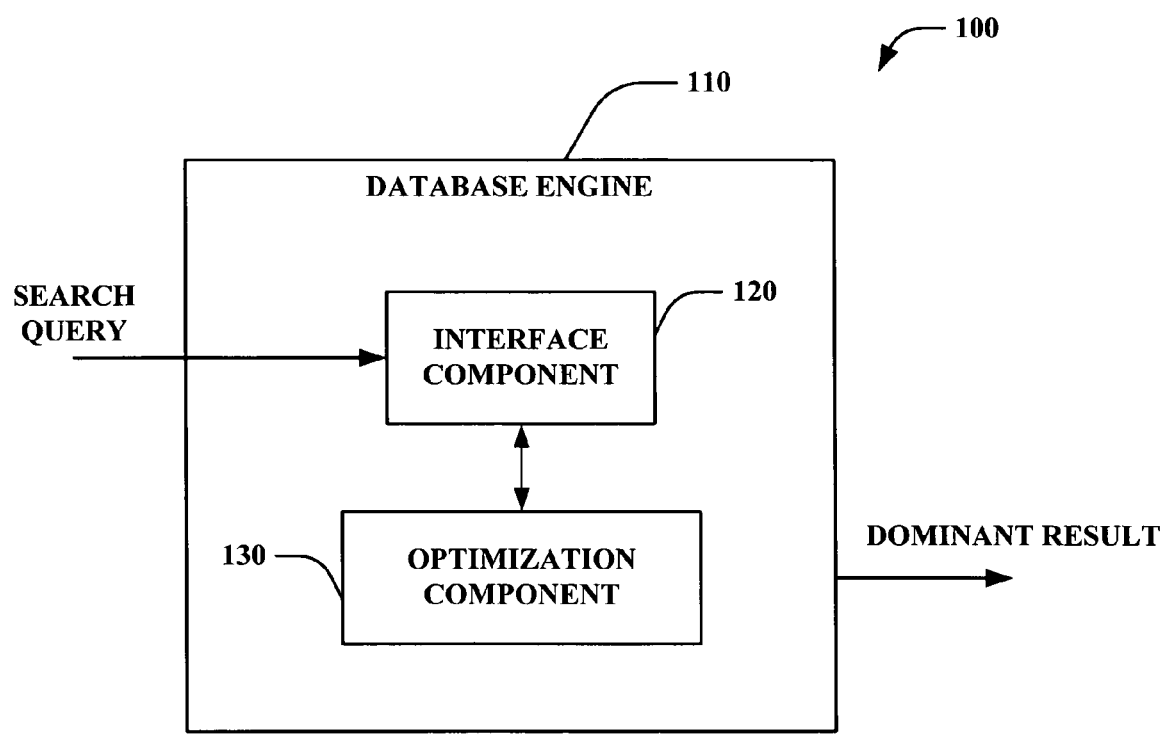
FIG. 1 illustrates a system that facilitates the production of dominant results, or a resultant skyline.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter can be practiced without these specific details. In other instances, well-known structures and devices are shown in block diagram form in order to facilitate describing the claimed subject matter.

The following terms are used throughout the description, the definitions of which are provided herein to assist in understanding various aspects of the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Prior to embarking on an expansive discussion of the claimed subject matter, it can be constructive and prudent at this juncture to provide a simplistic definition of the skyline operator. A skyline operator can be perceived and defined at the basic level as an operator that receives a set of preferences as input and returns those results for which there are no other results that are better with respect to all other input preferences. In other words, the skyline operator can return results that are not dominated by any other result. Thus, if it is assumed solely for the purposes of explication and not limitation, that T represents a relational table with a set of attributes, then a preference can be considered to be a partial order on the set of tuples that can be contained in the table T. Further, if it is assumed, once again for the purposes of elucidation and not limitation, that preferences can be categorized as being either predicate preferences or numeric preferences, then a predicate preference can be viewed as a predicate on the table T, for example (color='red'), that defines a partial order where all tuples that satisfy the predicate come before all other tuples. A numeric preference in contrast can be defined over a numeric attribute using an ordering of the domain where a tuple appears before (or after) another tuple if it has a lower (or higher) value as per the ordering. For example, (price LOW) is a numeric preference that defines a partial order on the tuples where a tuple comes before another tuple of it has a lower price.

Based on the foregoing understanding of preferences, the skyline operator can thus be considered in the following manner. If one assumes that P denotes a set of preferences, then it can be posited that a tuple $t_1$ dominates another tuple $t_2$ with respect to preferences P if $t_1$ appears before $t_2$ (e.g., is "better" than $t_2$) with respect to at least one atomic preference, and is not worse (e.g., is at least as good as) $t_2$ in all other preferences. Thus, given a table T and a set of preferences P, the resultant skyline of T (denoted as $S_P(T)$), can comprise the set of tuples in the table T that are not dominated by any other tuple. The skyline operator can thus receive a set of tuples as input and thereupon can output a skyline. To illustrate the skyline operator in action, for example, consider a set of used cars with attributes <price, year>, and assume that the tuples of this set are {<15,000, 1999>, <18,000, 2004>, <20,000, 2003>}. A skyline operator receiving as input a single numeric preference, for example (price LOW) can yield the cheapest car, e.g., <15,000, 1999>. Similarly, a skyline operator that receives as input a single numeric preference, for example, (year HIGH) can yield the newest car, e.g., <18,000, 2004>. However, a skyline operator that receives two numeric predicates, for example, (price LOW, year HIGH) yields two cars, {<15,000, 1999>, <18,000, 2004>}, since each of these cars is better than the other with respect to at least one attribute. In other words it can be stated that the car having the attributes <20,000, 2003> is dominated by the cars with attributes <15,000, 1999> and <18,000, 2004>, and as a consequence is not returned.

While there exist plethora of methodologies that can be utilized to effectuate the production of a skyline from execution of the skyline operator, for example, the Divide and Conquer methodology that divides a dataset into several partitions so that each partition fits into memory; the Nearest Neighbor technique that uses the results of a nearest-neighbor search to partition a data universe recursively; the Bitmap method that encodes in bitmaps all the information needed to decide whether a point is in the skyline; and the Index approach that organizes a set of d-dimensional points into d lists such that a point $p=(p_1, p_2, \ldots, p_d)$ is assigned to the $i^{th}$ list ($1 \leq i \leq d$), if and only if its coordinate $p_i$ on the $i^{th}$ axis is the minimum among all dimensions, or formally, $p_i \leq p_j$ for all $j \neq i$. The techniques selected and utilized herein, solely for the purposes of exposition and not limitation, refer to the Block-Nested-loop technique (BNL) and Block-Nested-loop with Presorting (SRT). Nevertheless, it is to be appreciated that any appropriate manner of obtaining the skyline can be utilized and thus will fall within the purview of the claimed subject matter.

The Block-Nested-Loop (BNL) method for obtaining the resultant skyline is a one where the methodology maintains a window of incompatible tuples in memory. Thus, when a tuple p is read from the input, the tuple p is compared with all tuples in the window of incompatible tuples maintained in memory, and based at least on this comparison, the tuple p can either be eliminated or placed in the window. Where the tuple p is placed in the window of incompatible tuples, all the tuples in the window that p dominates are discarded. Consequently, on completion of the methodology, all that remains in the window constitutes the resultant skyline. It is however to be understood that while the window of incompatible tuples is preferably maintained in memory, the window, in toto or parts thereof, can be written to a temporary file without departing from the ambit of the claimed subject matter.

The Block-Nested-Loop with Presorting (SRT) manner of acquiring the resultant skyline presorts the data using an appropriately selected monotone scoring function prior to effectuating the BNL methodology explicated above. A perceived advantage of presorting the data prior to the application of the BNL methodology is that dominating items are likely to appear at the top of the sorted data and as a consequence the window necessary to accommodate incompatible tuples can be commensurately smaller. A further discernable benefit of the SRT approach to effectuating the resultant skyline lies in the fact that once the data has been sorted a data item should not be dominated by any other data item that resides below it in the sorted data. Therefore, when a data item from the sorted data is added to the window the item added can be deemed to form part of the resultant skyline and thus can be immediately output.

Turning now to the figures, FIG. 1 illustrates a system 100 that facilitates the production of dominant results, or a resultant skyline, with respect to search queries associated with search preferences supplied to a database engine 110. The database engine 110 includes an interface component 120 that receives a search query associated with at least one preference. An example of a search query with associated preferences that may be received by the interface component 120 can be represented as follows:

SELECT *
FROM UsedCars
WHERE make='Car Manufacturer'
PREFERRING mileage LOW, price LOW The foregoing query represents a user searching for a used car with make=Car Manufacturer such that the car that is selected has the preference attributes of low mileage as well as low price. The result of this query, the dominant result, or skyline, should therefore comprise all Car Manufacturer cars such that no other Car Manufacturer car has a lower mileage and a lower price, i.e., all Car Manufacturer cars which are not "dominated." It is to be understood, however, that the foregoing exemplary search query is illustrative of but one search query, and that the claimed subject matter is not so limited.

The interface component 120 thus upon receipt of a search query and associated preference(s) conveys the search query to an optimization component 130 that generates a dominant result based at least in part on cost estimation and cardinality estimation functionality incorporated therein. It is to be appreciated that the dominant results so generated by the optimization component 130 can also be referred to as a resultant skyline based on the resemblance that the dominant results have with a city skyline were resultant dominant results can be graphically represented in two dimensions.

It is noted that the optimization component 130 in its efforts to generate the resultant skyline can utilize a skyline operator (not shown) to implement the preference queries received from the interface component 120. While the skyline operator can be expressed in SQL, it is generally recognized by those skilled in the art that a more efficient implementation requires the incorporation of the skyline operator within the database engine 110 itself, since it has been found that such incorporation has significant performance gains over direct implementation of the skyline operator using SQL alone. Thus, in order to achieve the efficiency gains associated with including the skyline operator within the database engine 110 one must be cognizant of the salient properties of the skyline operator that can improve performance significantly.

In particular, it has been found that non-optimized utilization of the skyline operator can be extremely CPU-intensive. Further, it has also been found that an erroneous estimation of the cardinality of the skyline operator (or the failure to provide an estimation for the cardinality of the skyline operator) with respect to other relational database operators, such as joins, for example, can result in considerable time delays. Thus, in order to alleviate these perceived hindrances to the use and integration of the skyline operator into the database engine 110, the optimization component 130 implements cost estimation and cardinality estimation prior to generating the dominant result.

Figure 2:
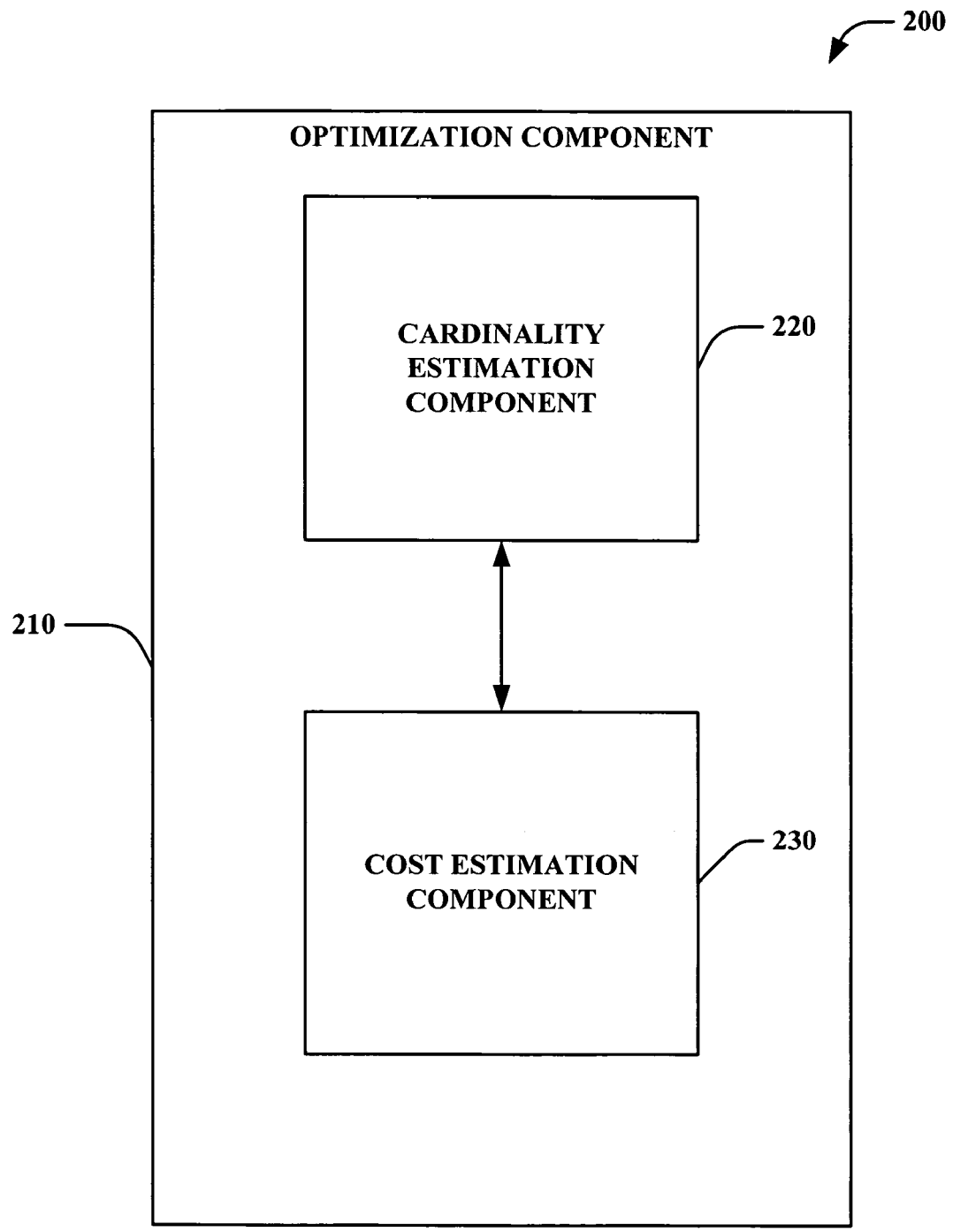
FIG. 2 illustrates an exemplary optimization component.

Turning now to FIG. 2, a more detailed depiction of an optimization component 210 is illustrated therein. The optimization component 210 can include, for example, a cardinality estimation component 220 that estimates the cardinality of the putative skyline that can be generated by the skyline operator, and a cost estimation component 230 that receives the cardinality estimation generated by the cardinality estimation component 220. The cost estimation component 230 can, based at least in part on the cardinality estimation received from the cardinality estimation component 220, determine a cost associated with generating the skyline.

The cardinality estimation component 220 in analyzing and generating an optimal cardinality can function on the basic understanding that it can often be unproductive to place the skyline operator as the top-most operator in an operator tree, and further that interaction of the skyline operator with other relational operators Ioins, selections, etc.) by in effect allowing the skyline operator to be pushed down the operator tree can result in significant performance benefits.

Since the skyline operator can generally be viewed as an aggregating operator similar to the groupby operator, the resultant cardinality of the skyline, like the groupby operator, can vary anywhere from a few tuples to an entire input relation. Consequently, due to this variation, pushing the skyline operator down the operator tree can render significant dividends in relation to improved performance. This improved performance aspect of strategically positioning the skyline operator can be better understood by considering the following example.

Assume that the following query is received by the optimization component 210 and is thereafter conveyed to the cardinality estimation component 220.

SELECT *
FROM Cars, Dealer
WHERE    make='Car    Manufacturer'    and Cars.dealer=Dealer.id
PREFERRING price LOW Additionally, for the sake of illustration and not limitation, further assume that the database upon which the query is to be run against includes two relations, Cars<make, price, year, dealer> and Dealer<id, location>, and that Cars.dealer is a foreign key pointing to Dealer.id. In order to effectuate this query, the Cars table and the Dealer table must ultimately be joined. If the skyline operator is placed as the top-most operator after the join in the operator tree, then a full join has to be evaluated before a skyline computation can be undertaken. If however, the skyline computation is effectuated prior to undertaking the join operation far fewer tuples need to be joined with the Dealer relation. The drastic consequences of the strategic placement of the skyline operator can be further emphasized if in addition it is assumed that the prices contained in the Cars table are all unique, then exactly one tuple will pass the skyline operation with the consequence that only one tuple will have to be joined with the Dealer relation, resulting in potentially large savings.

Additionally, the cardinality estimation component 220 should be cognizant that there can be distinctions between the skyline operator and traditional operators, such as, for example, the selection operator. This distinction can be borne out by comparing the skyline operator and the selection operator wherein it can be shown that when additional selection predicates/preferences are added, cardinality can decrease markedly. In contrast, adding extra preferences/predicates to the skyline operator can result in dramatically increased cardinality.

The cardinality estimation component 220 should further be aware when estimating the cardinality of the skyline operator, that the skyline operator can be very sensitive to correlations among database attributes. For example, when attributes have perfect correlation, the resultant skyline produced by executing the skyline operator can return a single tuple. On the other hand, where database attributes have perfect anti-correlation, the resultant skyline produced by execution of the skyline operator can be an entire table. Typically however, it has been found that the degree of correlation amongst database attributes lies somewhere between the two extremes. Moreover, it has also been found that correlations between numerical preferences can in practice exist more often than correlations between predicate preferences.

Correlation between numerical attributes can be better illustrated and understood within a used car paradigm, wherein it is generally understood among buyers of used cars that the "greater the age of a car and the higher the mileage of the car, the lower the price of that car." Thus, a query with preference attributes (age LOW, mileage LOW) can yield fewer answers than a query that manifests preference attributes (mileage LOW, price LOW). As a corollary to the foregoing it should also be noted for example, that users typically attempt to optimize complementary goals and as such many user preference are likely to be anti-correlative. Nevertheless, one of the paramount concepts that the cardinality component 220 should recognize is the fact that the effect of correlation among attributes is much more pronounced for a skyline operator than for other relational operators, such for example, the selection operator.

With respect to estimating the cost of computing the skyline, the cost estimation component 230 must be cognizant that skyline computation is more challenging than other physical operators as it is CPU-intensive. It is known for example, that if there is sufficient memory to hold the generated skyline in its entirety, then the generated skyline can be determined using a single scan of the data. However, processing each tuple in memory requires a large amount of time and this can completely dominate the cost of a single scan. For example, it has been found that on a randomly generated table with 100,000 tuples, the total time taken utilizing the Block-Nested-Loop (BNL) algorithm to compute the skyline on 5 and 7 dimension can be about 1.2 seconds and 21 seconds respectively, while the time taken to scan the entirety of the input can be about 0.09 seconds. Thus, the cost estimation component 230 must, in addition to being aware that skyline computation is both I/O and memory intensive, be aware that skyline generation is also CPU-intensive, and that in order to satisfactorily estimate the cost of the skyline that an estimate of the number of comparisons that may have to be undertaken to generate the skyline may have to be undertaken.

Figure 3:
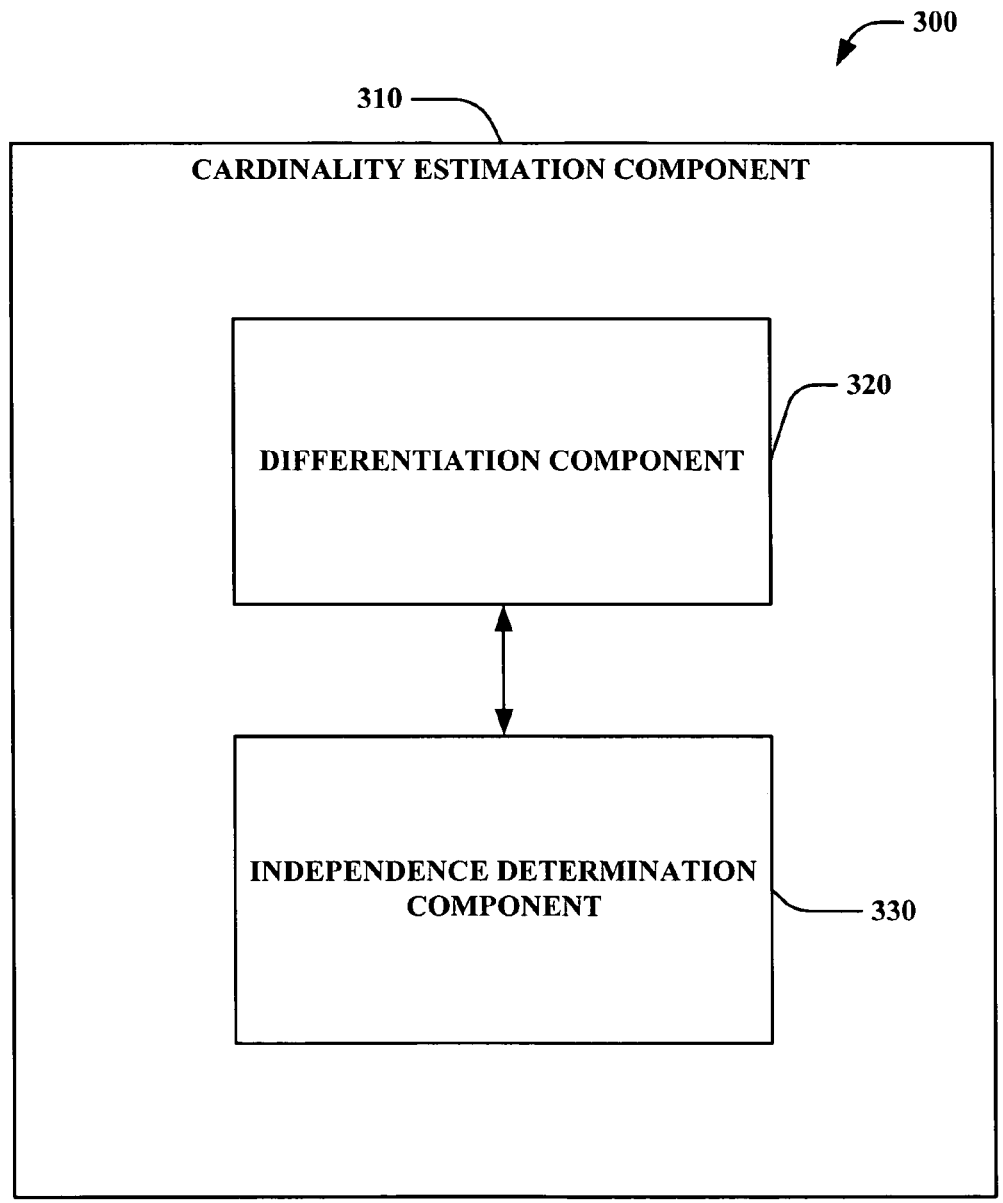
FIG. 3 illustrates an exemplary cardinality estimation component.

Referring now to FIG. 3, a more detailed illustration of a cardinality estimation component 310 is depicted. The cardinality estimation component 310 can comprise a differentiation component 320 that receives the query and its associated preferences submitted to the cardinality estimation component 310 and differentiates between numeric preferences (e.g., (price=Low) and (mileage=LOW)) and predicate preferences (e.g., (color='green') and (price between 5000 and 10,000)). The cardinality estimation component 310 can also comprise an independence determination component 330 that determines whether the preferences submitted with the query received by the cardinality estimation component 310 are independent of, and/or correlated with, one another.

Where the differentiation component 320 determines that all the preferences associated with a query are numeric preferences, and further where the independence determination component 330 determines that all the tuples to be accessed to generate the skyline are independent of one another, the cardinality estimation component 310 can make the assumption that $|S_P(T)|$—the expected cardinality of the resultant skyline—may be dependent only on the size of the table T and the number of independent and numeric attributes P. Thus the cardinality estimation component 310 can utilize the following recurrence:

$$s(n, d) = \frac{1}{n}s(n, d-1) + s(n-1, d) \quad (1)$$

where s(n,d) denotes the expected size of the resultant skyline with d attributes and n data points. The validity of the foregoing recurrence can be illustrated by considering a tuple that has the smallest value with respect to a first preference. For this tuple to be in the resultant skyline, the tuple with the smallest value must be in the resultant skyline of the remaining preference. The probability of this occurring can be expressed as $$\frac{1}{n}s(n, d-1)$$

since there are n total tuples and s(n,d−1) of them are in the resultant skyline of the remaining preferences. Further, the tuple that has the smallest value with respect to the first preference cannot be dominated by any other tuple. Therefore, out of the remaining n−1 tuples, s(n−1,d) are expected to be in the resultant skyline. Thus, while there is no closed form for the recurrence, it is generally known by persons reasonably skilled in the art that s(n,d) is $\theta((\ln n)^{d-1}/(d-1)!)$.

It will be noted by persons generally versed in the art however, that the foregoing recurrence does not typically hold when the set of preferences P includes predicate preferences. The recurrence set forth in equation (1) is generally only satisfied under the assumption that no two tuples are equally good with respect to any preference, e.g., each preference totally orders the set of tuples. Consequently, this assumption is violated by predicate preferences which typically divide the tuples into two sets: those tuples that satisfy the predicate and those that do not. Further, it has also been recognized that the recurrence set forth in equation (1) is deficient when there are correlations among attributes.

In recognition of the deficiencies set forth above, where the differentiation component 320 detects that the one or more preferences associated with the query include either predicate preferences or numeric preferences, and the independence determination component 330 ascertains that the tuples to be accessed are independent and identically distributed according to some distribution despite there being correlations between the attributes, the cardinality estimation component 310 can utilize the following formula to estimate the putative size of the resultant skyline:

$$\int_{[0,1]^d} f(\overline{x})(1-F(\overline{x}))^{n-1} d\overline{x}$$

The validity of the foregoing formula in ascertaining the cardinality of the resultant skyline can be demonstrated if one assumes that the tuples are independently and identically distributed according to some distribution even though attributes may have correlations between them. Thus, if one lets $X_1, X_2, \ldots X_d$ represent a set of attributes on which a resultant skyline is to be computed, and if one further assumes that these attributes can take values between 0 and 1, and additionally, if one assumes that $F(x_1, x_2, \ldots x_d)$ denotes the joint distribution function of the k variables, e.g., the probability $[X_1 \leq x_1, \ldots X_d \leq x_d]$, and further let $f(x_1, \ldots x_d)$ denote the joint density function. Then in vector notation one can write them as $f(\overline{x})$ and $F(\overline{x})$, where $\overline{x}=(x_1, \ldots, x_d)$. Consequently, to ascertain the putative size of the resultant skyline from the perspective of a data item $t_i$ that has values $\overline{x}=(x_1 \ldots x_d)$, for the data item $t_i$ to be in the resultant skyline none of the other $n_1$ data points should have all attributes smaller than $t_i$. The probability of this occurring is $(1-F(\overline{x}))^{n-1}$. Since $t_i$ itself comes from a distribution with density $f(\overline{x})$, the probability that a randomly chosen data point belongs to the resultant skyline is:

$$\int_{[0,1]^d} f(\overline{x})(1-F(\overline{x}))^{n-1} d\overline{x}$$

Thus, since there are n tuples, by the linearity of expectations the following general equation can be fashioned. If one assumes that $t_1, t_2 \ldots t_n$ are n tuples drawn from the above probability distribution, then the expected value of the skyline $S_p(n)$ is:

$$n\int_{[0,1]^d} f(\overline{x})(1-F(\overline{x}))^{n-1} d\overline{x}. \quad (2)$$

Thus, equation (2) is a generic equation applicable to any data distribution that provides the cardinality estimation component 310 with an expression that can be utilized to ascertain skyline cardinality under various settings, such as when the preferences supplied with the query are numeric or predicate and independent despite there being correlations between the tuples.

Nevertheless, it may be recognized that utilization of equation (2) above by the cardinality estimation component 310 generally only yields an accurate estimation of the resultant skyline when the preferences supplied with the associated query are determined by the differentiation component 320 to be either numeric or predicate and where the independence determination component 330 ascertains that the tuples are independent of one another even though there may be correlations between the tuples. In order to address this contingency, the cardinality estimation component 310 can generate an estimation of cardinality where the differentiation component 320 ascertains that the preferences supplied with the query contain one or more numeric preferences and predicate preferences, e.g., the preferences supplied with the query contain both numeric as well predicate preferences (e.g., (color='blue' and mileage LOW)), and the independence determination component 330 determines that the tuples to be accessed to service the query are independent. Under this situation the cardinality estimation component 310 can exploit the following relationship to determine the expected value of $|S_P(n)|$, the estimated cardinality:

$$n \sum_{v \in \{0,1\}^d} \int_{[0,1]^d} P_1(v)(1-P_2(v)x_1 \ldots x_d)^n dx_1 \ldots dx_d \qquad (3)$$

The validity of the foregoing relationship can be demonstrated as follows. If one assumes that $s(n,d)$ denotes the cardinality of the resultant skyline over n tuples and d numeric preferences where all the preferences are independent, then through utilization of equation (2) above, one obtains:

$$s(n,d) = n \int_{[0,1]^d} (1-x_1 x_2 \ldots x_d)^{n-1} dx_1 \ldots dx_d, \qquad (4)$$

since under independence $f(x_1, \ldots, x_d)$ can be written as $f_1(x_1)f_2(x_2) \ldots f_d(x_d)$ and $F(x_1, \ldots x_d)$ can be written as $F_1(x_1) \ldots F_d(x_d)$, where $f_i(x_i)$ is the density and $F_i(x_i)$ is the distribution of attribute $X_i$. Moreover, if $f_i$ is continuous, then $f_i(x_i) = F'_i(x_i)$. The foregoing thus produces an alternative expression for $s(n,d)$ that is equivalent to that provided by the recurrence in equation (1). While, it should be noted that the integral has no closed form, there nevertheless exit within the art several numerical methods to evaluate the integral.

Now since the goal is to determine a resultant skyline that contains both numeric as well as predicate preferences, one can represent the predicates as $P = \{Y_1, \ldots Y_k, X_1, \ldots X_d\}$, where $Y_i$ are predicate preferences and $X_i$ are numeric preferences, and that $Y_i$ is 1 when the predicate is satisfied and 0 when the predicate is unfulfilled. Thus, if it is assumed that $p_i$ denotes the selectivity of the predicate $Y_i$ (e.g., the probability that $Y_i=1$), $v \in \{0,1\}^k$ connotes any vector, and $v_i$ represents its ith component, then $$P_1(v) = \prod_i p_i^{v_i}(1-p_i)^{1-v_i} \text{ and } P_2(v) = \prod_i p_i^{1-v_i}$$

where $P_1(v)$ represents the probability that the attributes $\{Y_1, \ldots Y_k\}$ have a value given the vector v. Similarly, $P_2(v)$ represents the probability that the attributes $\{Y_1, \ldots Y_k\}$ have a value less than or equal to the vector v. Thus, by substituting this conclusion into equation (4) one obtains the result represented in equation (3), the expected value of the resultant skyline $|S_P(n)|$.

To further illustrate the foregoing consider a query with the following four associated preferences (make='Car Manufacturer', year >2001, price LOW, mileage LOW). As can be seen the associated preferences comprise two predicate preferences (make='Car Manufacturer' and year >2001) and two numeric preferences (price LOW and mileage LOW). Now for sake of example, if one assumes that the predicate make='Car Manufacturer' has 0.15 selectivity and the predicate year >2001 has selectivity 0.4, and further it is assumed that all the attributes supplied are independent, then the expected cardinality given by equation (3) above can be:

$$n \int_{[0,1]^2} (f_1 + f_2 + f_3 + f_4) dx_1 dx_2$$

where
$f_1(x_1, x_2) = 0.15 * 0.4(1 - x_1 x_2)^n$
$f_2(x_1, x_2) = 0.15 * 0.6(1 - 0.4 * x_1 x_2)^n$
$f_3(x_1, x_2) = 0.85 * 0.4(1 - 0.15 * x_1 x_2)^n$
$f_4(x_1, x_2) = 0.85 * 0.6(1 - 0.15 * 0.4 x_1 x_2)^n$ Nevertheless, notwithstanding the utilization by the cardinality estimation component 310 of the preceding recurrences and equations, large errors in the estimate of the putative cardinality of the skyline can still occur, especially where there are correlations between attributes. Where there are correlations between attributes a skyline can vary in size from a single tuple (when attributes are perfectly correlated) to a whole relation (when attributes are perfectly anti-correlated). In order to obviate these large discrepancies, the cardinality estimation component 310 can adopt techniques to better estimate the putative skyline in the presence of correlations. While two exemplary techniques are elucidated herein (sampling and histograms), other techniques, such as wavelets, are equally applicable in curtailing the variances associated with estimating the cardinality of the skyline in the face of correlations, and can thus find application in association with the claimed subject matter.

Figure 4:
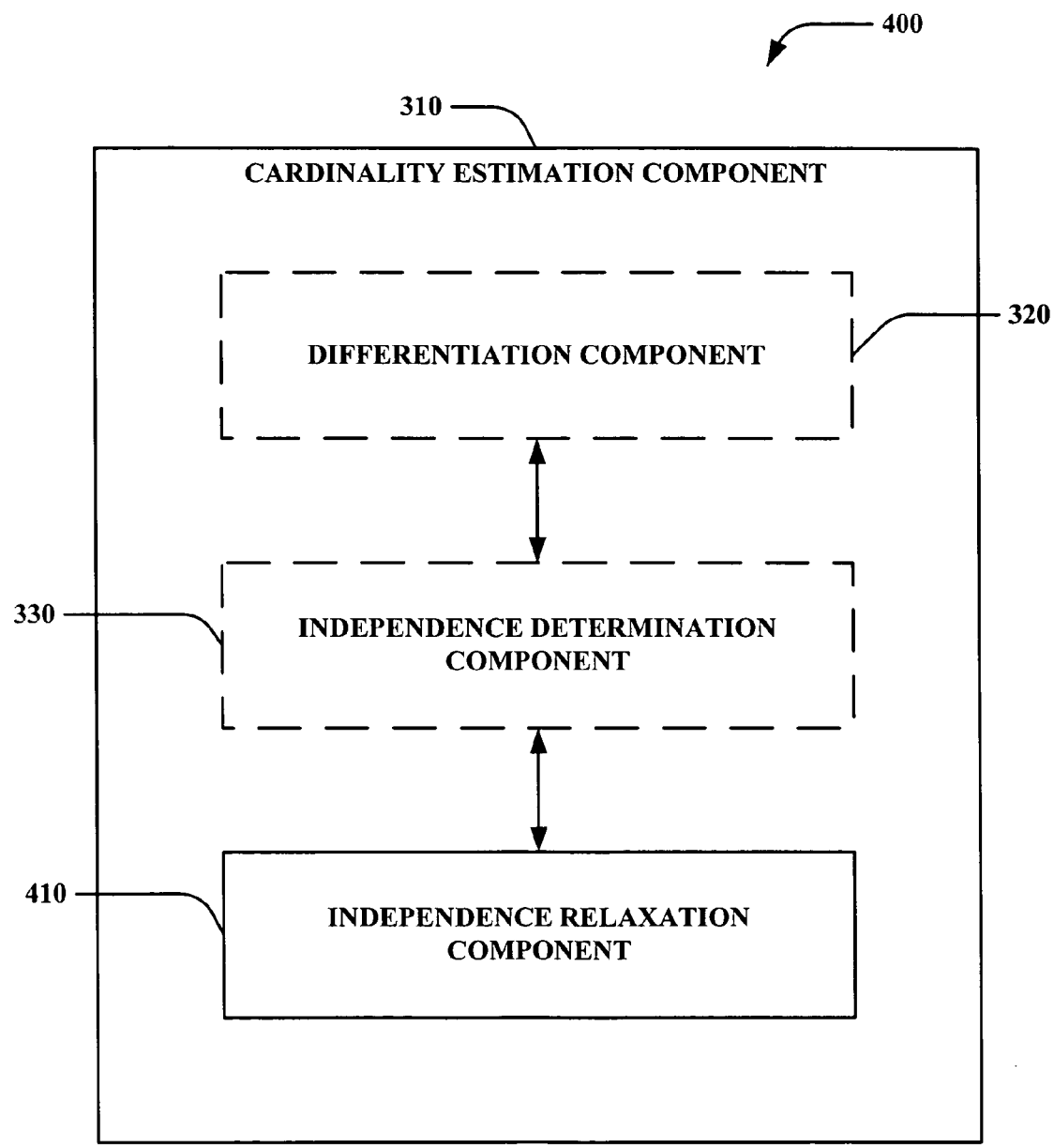
FIG. 4 is a further depiction of the of the exemplary cardinality component.

Turning to FIG. 4, illustrated therein is a further depiction of the cardinality component 310 that includes, in addition to the differentiation component 320 and independence determination component 330 discussed above, an independence relaxation component 410 that in conjunction with the differentiation component 320 and independence determination component 330 facilitates the cardinality estimation component 310 in more accurately estimating the tentative cardinality of the skyline. The independence relaxation component 410 can utilize a sampling technique wherein the independence relaxation component 410 can compute the skyline size on a small random sample (or subset) of the data and then based on the result of the computation, the independence relaxation component 410 can linearly scale the resultant skyline on the small random sample to reflect the estimated size of the skyline should the data in its entirety be utilized to generate a skyline. In some instances the sampling technique does not work appropriately as the size of a resultant skyline is not necessarily a linear function of the data size. However despite this, the sampling technique as utilized by the independence relaxation component 410 can prove useful in indicating to the cardinality estimation component 310 whether anti-correlations exist amongst the attributes. Indications that anti-correlations exist among the attributes can be manifest where the linearly scaled skyline based on the random sample as generated by the independence relaxation component 410 is greater than the skyline that is generated by the cardinality estimation component 310 without utilization of the independence relaxation component 410.

The foregoing is borne out by the fact that when attributes are independent, the skyline size on d attributes is $\theta(\log^d n)$, and that when there are correlations/anti-correlations that are not large, it has been observed that the skyline still grows at some power of log n. Based on this hypothesis it is possible for the cardinality estimation component 310 to utilize the independence relaxation component 410 in the following manner to provide a better estimate of skyline cardinality in the presence of correlations/anti-correlations. The cardinality estimation component 310 having determined, through utilization of the differentiation component 320 and the independence determination component 330, that the submitted query preferences are both numeric and predicate preferences, as well as having ascertained that the preferences are not independent, the cardinality estimation component 310 can employ the independence relaxation component 410 to determine that the attributes are not perfectly anti-correlated and further ensure that the putative skyline does not contain all tuples. Where the independence relaxation component 410 ascertains that the attributes are not perfectly anti-correlated and/or that the tentative skyline does not comprise all tuples, then the cardinality estimation component 310 can assume that the size on a given set of attributes is A $\log^B$ n. Thus, based on this assumption, the cardinality estimation component 310 can compute the skyline on a small sample of the data to estimate the parameters A and B and use them to calculate the size of the skyline for the whole data. However, as stated earlier, the utilization of this sampling technique may not necessarily be efficacious in all situations.

Thus, in recognition that utilization of the sampling technique alone may not give accurate results where there are perfect anti-correlations between the attributes and where the tentative skyline contains all tuples, the cardinality estimation component 310 can further employ histograms to facilitate skyline size estimation. Thus, where the independence relaxation component 410 indicates that there exists, or might exist, perfect anti-correlations among the data attributes and/or that the possible skyline might contain all the tuples in the data, the cardinality estimation component 310 can employ one or more histograms to estimate the joint distribution function of the attributes, e.g., the functions F($\bar{x}$) and $f(\bar{x})$ in equation (2) above. The cardinality estimation component 310 effectively divides the joint domain of all the attributes into small buckets and maintains a histogram that counts the number of data points in each bucket. Thus, the cardinality estimation component 310 can then approximate $f(\bar{x})$ on a bucket as the fraction of the data points in that bucket and F($\bar{x}$) as the fraction of data points that lie in buckets below the given bucket. In this manner the cardinality estimation component can more accurately estimate the putative skyline.

Figure 5:
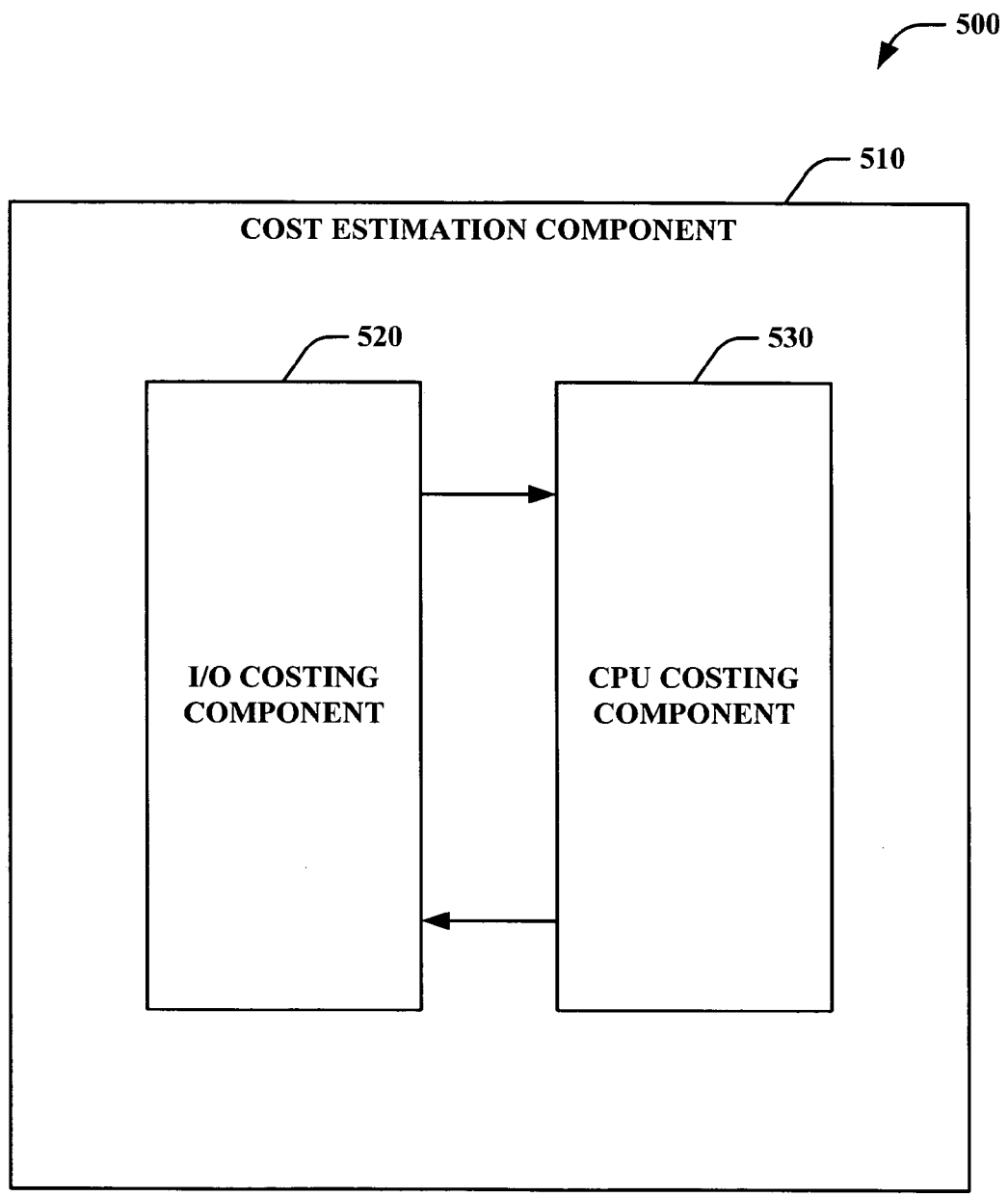
FIG. 5 illustrates an exemplary cost estimation component.

With reference to FIG. 5, there is illustrated a more detailed depiction of a cost estimation component 510 that provides a cost estimation for generating the skyline. The cost estimation component 510 can include an I/O costing component 520 that determines the cost associated with scanning data into memory in order to fulfill the generation of the skyline. Further, the cost estimation component 510 can also include a CPU costing component 530 that computes the cost associated with generating the skyline based at least in part on one or more techniques, such as Block-Nested-Loop (BNL) and Block-Nested-Loop with Presorting (SRT), for example.

One ordinarily skilled in the art is generally cognizant of the fact that costing the skyline operator is more challenging than other physical operations because generation of the skyline can be extremely CPU intensive. Further, it is also generally recognized that if there is sufficient memory to hold the resultant skyline that the resultant skyline can be computed using a single scan of the data. Nevertheless, even though there may be sufficient memory to hold the totality of the resultant skyline, there still remains costs associated with processing each tuple in memory that can be time intensive as each tuple loaded into memory must be compared with all the maximal tuples that have been found so far.

Assuming that the skyline operator completes after a single scan of the data and further utilizing either the Block-Nested-Loop (BNL) technique or the Block-Nested-Loop with Presorting (SRT) technique for generating a resulting skyline, it can be seen that there are two components associated with the cost: the I/O cost of scanning the data and the CPU cost of processing it. Thus, it has been found that the I/O costing component 520 can compute the cost associated with generating a skyline by simply determining the size of the relation. Further is has also been observed that under the above assumptions that the CPU cost that is computed by the CPU costing component 530 is directly proportional to the number of comparisons performed in memory. Thus, in order to determine the CPU cost associated with generating a resultant skyline utilizing either the Block-Nested-Loop (BNL) or the Block-Nested-Loop with Presorting (SRT) techniques the CPU costing component 530 determines an expected number of comparisons that may be performed by the respective technique utilized to compute the skyline.

Figure 6:
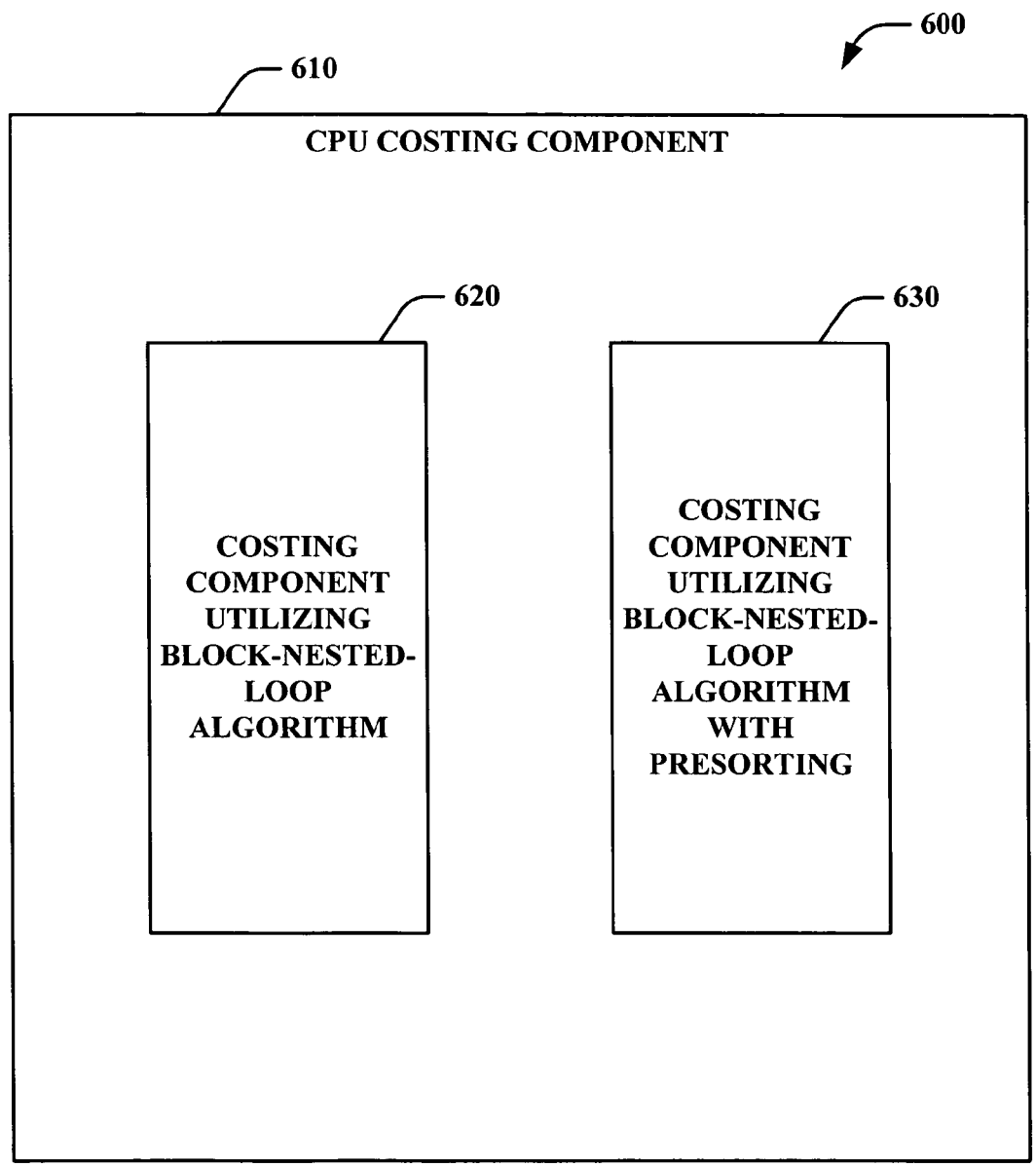
FIG. 6 illustrates an exemplary CPU costing component.

Turning now to FIG. 6, therein is illustrated a depiction of the CPU costing component 610 that ascertains the CPU cost associated with generating a skyline. The CPU costing component 610 effectively ascertains the least CPU-intensive algorithm/technique to utilize in generating a skyline, and thus can comprise a component 620 that estimates the CPU cost associated with utilizing the Block-Nested-Loop (BNL) algorithm/technique and a component 630 that estimates the CPU cost associated with employing the Block-Nested-Loop algorithm/technique with Presorting (SRT).

With reference to component 620 that estimates the CPU cost utilizing the Block-Nested-Loop (BNL) algorithm/technique, the component 620 can utilize the following equation to determine the expected number of comparisons that can be performed by the Block-Nested-Loop (BNL) algorithm and thus the CPU cost associated with generating the skyline if the Block-Nested-Loop (BNL) algorithm/technique were to be used in a specific instance:

$$C_{BNL}(n, P) \approx \sum_{i=1}^{n} \sum_{j=i+1}^{n} \frac{s(j-1, P)}{j-1} * \frac{s(j-i-1, P)}{j-i-1} \qquad (5)$$

wherein $C_{BNL}(n, P)$ denotes the expected number of comparisons that can be performed by the Block-Nested-Loop (BNL) technique, n represents the number of data points, P connotes the set of preferences associated with a submitted query, i and j are counters, and s(x, P) represents the expected cardinality of the resultant skyline for the preferences P on x data points.

The veracity of the foregoing equation to approximate the expected number of comparisons performed by the Block-Nested-Loop (BNL) algorithm can be determined by considering a skyline operator $S_P(T)$ that computes a skyline over a table T with respect to the set of preferences P. P may contain both numeric and predicate preferences. If one assumes in addition that there is some underlying data distribution for the tuple in T, which may have correlations between attribute values, and if one further assumes that the tuples in table T are not laid out in any particular order so that the tuples that constitute the resultant skyline have an equal chance of occurring anywhere in the table T. Thus, if one lets s(n, P) denote the function that gives the expected value of $|S_P(T)|$ when T contains n tuples selected from the underlying data distribution, and similarly if one lets $C_{BNL}(n, P)$ denote the expected number of comparisons performed by the Block-Nested-Loop (BNL) algorithm, one can derive an expression for $C_{BNL}(n, P)$ in terms of s(n, P).

In order to derive the expression for $C_{BNL}(n, P)$ in terms of s(n, P), let the data items be numbered from 1 to n. For $1 \leq i \leq j \leq n$, let $P_{i,j}$ denote the probability that the data items i and j are compared. For this to happen, i should be in memory when j comes and j should not get discarded before it is compared with i. For the former to happen, i must be in the skyline of the first j−1 data items. The probability of this occurring is $$\frac{s(j-1, P)}{j-1}$$

since s(−1, P) out of the j−1 elements are expected in the resultant skyline assuming that tuples in the table T are ordered randomly. For the latter to occur, j should be in the skyline of data items i+1 to j−1. This is because j will be compared to all the data items numbered greater than i before it is actually compared with i. The probability of this happening is $$\frac{s(j-i-1, P)}{j-i-1},$$

and $P_{i,j}$ can be approximated using the following approximation:

$$P_{i,j} \approx \frac{s(j-1, P)}{j-1} * \frac{s(j-i-1, P)}{j-i-1}$$

Note that the equality need not be exact because the event that i is in the skyline of the first j−1 data items is not independent from the event that j is in the skyline of i+1 to j−1. Thus, by linearity of expectations, the expected number of comparisons is $$C_{BNL}(n, P) = \sum_{i=1}^{n} \sum_{j=i+1}^{n} P_{i,j}$$

Substituting the expression for $P_{i,j}$ in the above equation, one gets the expression for the expected number of comparisons performed by a Block-Nested-Loop (BNL) algorithm on n data points as set forth in equation (5) above. It should be noted that the expression presented in equation (5) is applicable irrespective of whether the preferences associated with the skyline query are numeric or predicate preferences or whether the attributes are correlated. All that is required is that the correct expression for s(n, P) be received from the cardinality estimation component 310 (FIG. 3).

While the expression set forth in equation (5) gives the exact expression for the expected number of comparisons performed by the Block-Nested-Loop (BNL) algorithm and can be employed by the component 620 that costs utilization of the Block-Nested-Loop (BNL) algorithm, it has nevertheless been observed that when the number of data points n is large that computation of the CPU cost itself becomes expensive. To ameliorate the effects of this the following can be used to efficiently approximate the cost where there are a large number of data points. If one denotes $$\frac{s(j-1, P)}{j-1} * \frac{s(j-i-1, P)}{j-i-1}$$

as being represented by the function $f(i,j)$, then $C_{BNL}(n, P)$ is $\sum_{i=1}^{n} \sum_{j=i+1}^{n} f(i, j)$. To approximate this function, one can divide the domain of the summation into small parts, and in each part, assume $f(i,j)$ to be constant. This is analogous to the mid-point method for numerical integration, and thus gives the following expression that can be utilized by component 620 to approximate the cost associated with utilizing the Block-Nested-Loop (BNL) algorithm in generating a skyline:

$$C_{BNL}(n, P) \approx \sum_{i=1}^{k} \sum_{j=i+1}^{k} k^2 * f\left(i\frac{n}{k} + \frac{k}{2}, j\frac{n}{k} + \frac{k}{2}\right).$$

As a corollary it should be noted that if it is determined by the cardinality estimation component 310 via the differentiation component 320 (FIG. 3) that the attributes associated with the submitted skyline query are all numeric preferences, equation (5) can be simplified and utilized by component 620 as follows:

$$C_{BNL}(n, P) \approx \sum_{j=2}^{n} \frac{s(j-1, d)}{j-1} s(j-1, d+1).$$

With reference to component 630 that estimates the CPU cost associated with employing the Block-Nested-Loop algorithm with Presorting (SRT). At the outset it should be noted that the only difference between the Block-Nested-Loop (BNL) algorithm as utilized in component 620 above, and the Block-Nested-Loop algorithm with Presorting (SRT) as employed by component 630 lies in the fact that the latter algorithm comprises a presorting phase wherein data points are sorted prior to performing the skyline computation. Thus, the task of estimating the CPU costs associated with the sorting phase can be obtained through any one of a plethora of currently existing techniques. Thus, the CPU cost of computing the skyline is similar to that of the Block-Nested-Loop (BNL) algorithm requiring an estimate of the number of comparisons performed in memory. The component 630 therefore can utilize the following approximation to estimate the expected number of comparisons performed by the skyline operator:

$$C_{SRT}(n, P) \approx \sum_{i=1}^{n} \sum_{j=i+1}^{n} \frac{s(j-1, P')}{i-1} * \frac{s(j-i-1, P')}{j-i-1} \qquad (6)$$

wherein $C_{SRT}(N, P)$ represents the expected number of comparisons performed by a skyline operator on n data points with P as the set of preferences.

To ascertain the veracity of the aforementioned approximation, assume that $C_{SRT,A}(n, P)$ denotes the expected number of comparisons performed by the skyline operator on n points with P as the set of preferences when the data is sorted on attribute A. Further, assume s(x, P) denotes the expected cardinality of the resultant skyline for preferences P on x data points and suppose that the data points have been sorted on attribute A. Moreover, if one lets P' denote the preferences obtained by deleting from P the preference on A, where A is not order-correlated with the rest of the attributes then one obtains equation (6) set forth above, which implies that sorting the data on an attribute roughly incurs the cost of computing the skyline on the remaining attributes.

Figure 7:
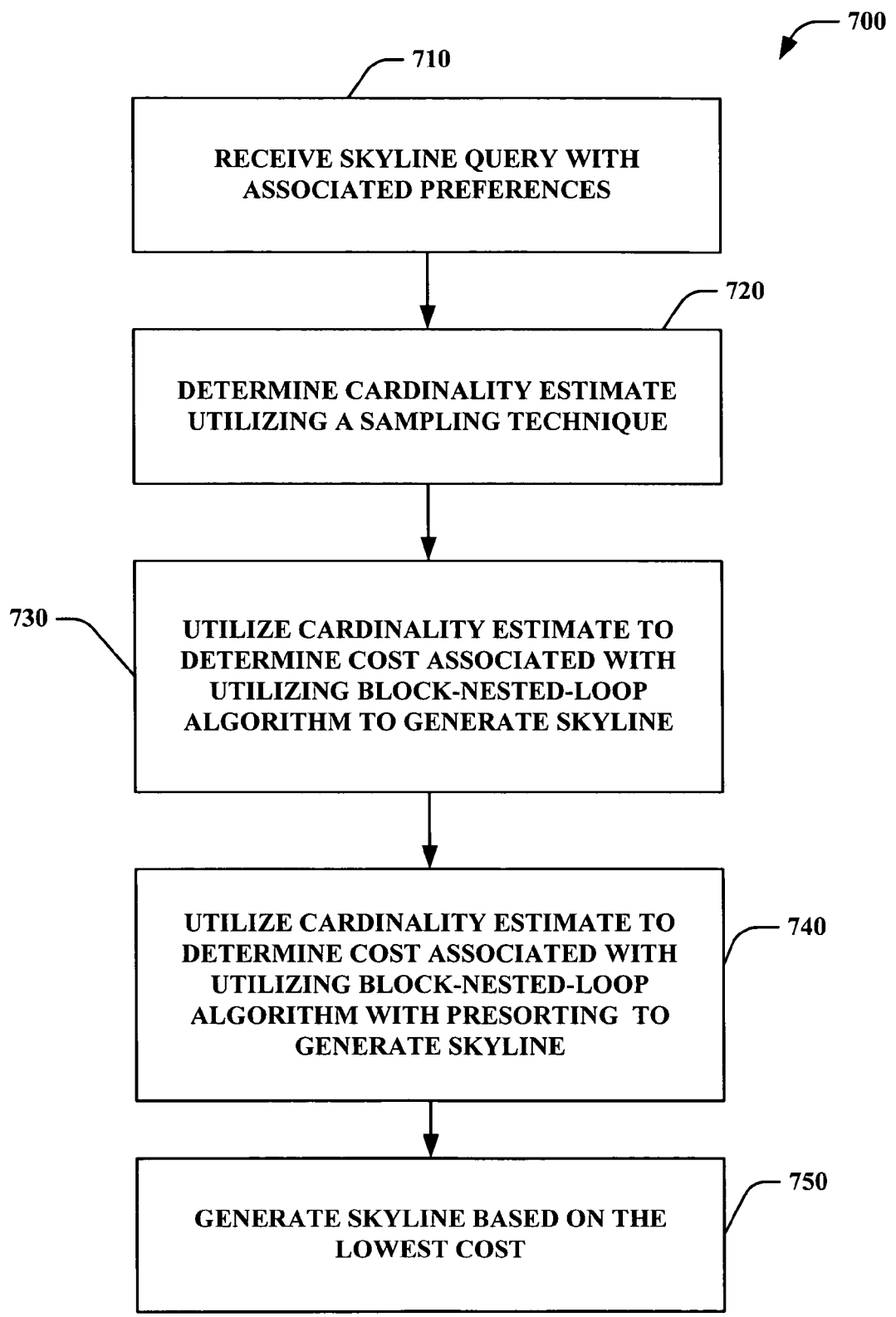
FIG. 7 illustrates an exemplary methodology for generating a skyline.
Figure 8:
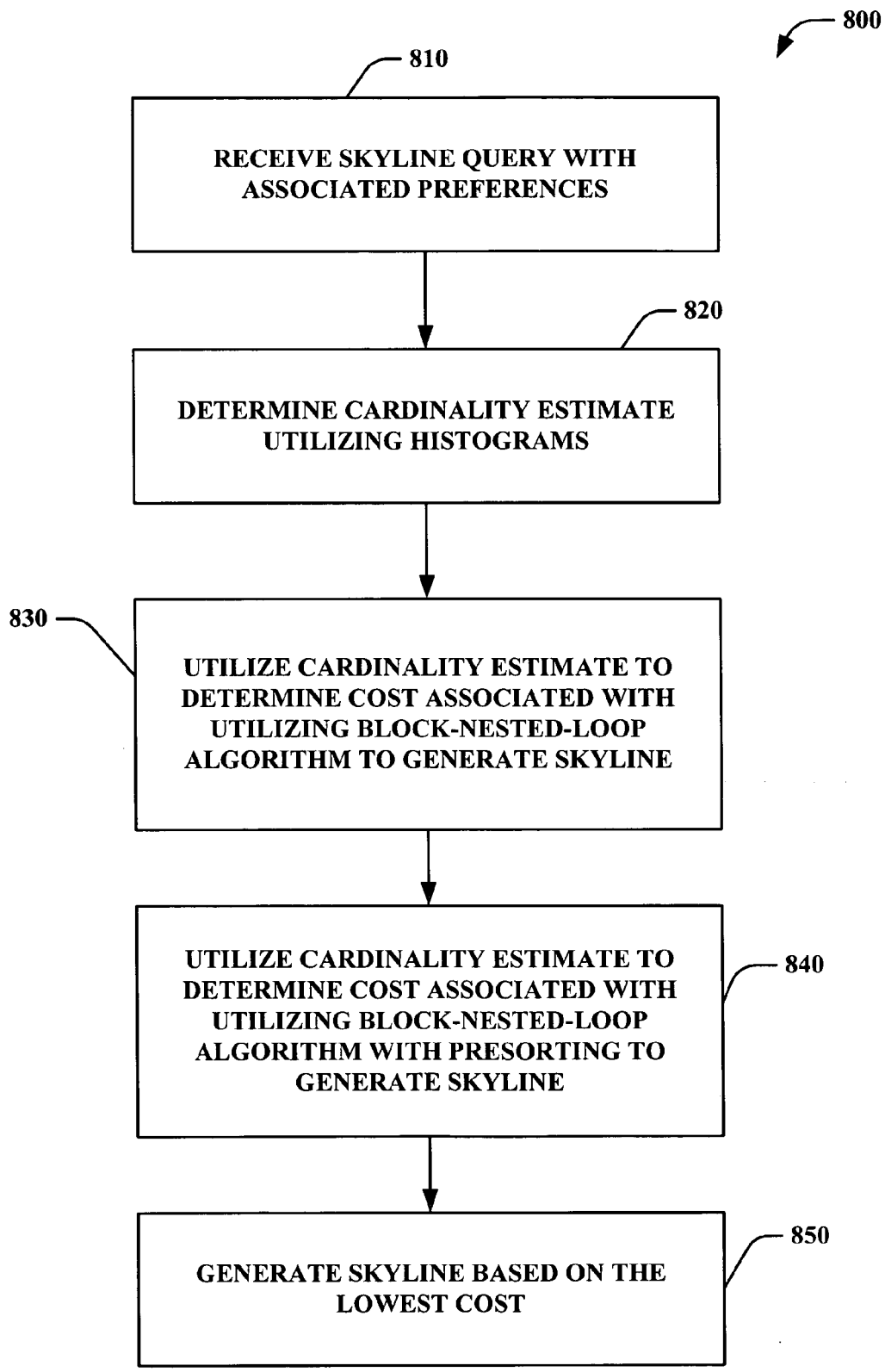
FIG. 8 illustrates a further exemplary method for generating a skyline.
Figure 9:
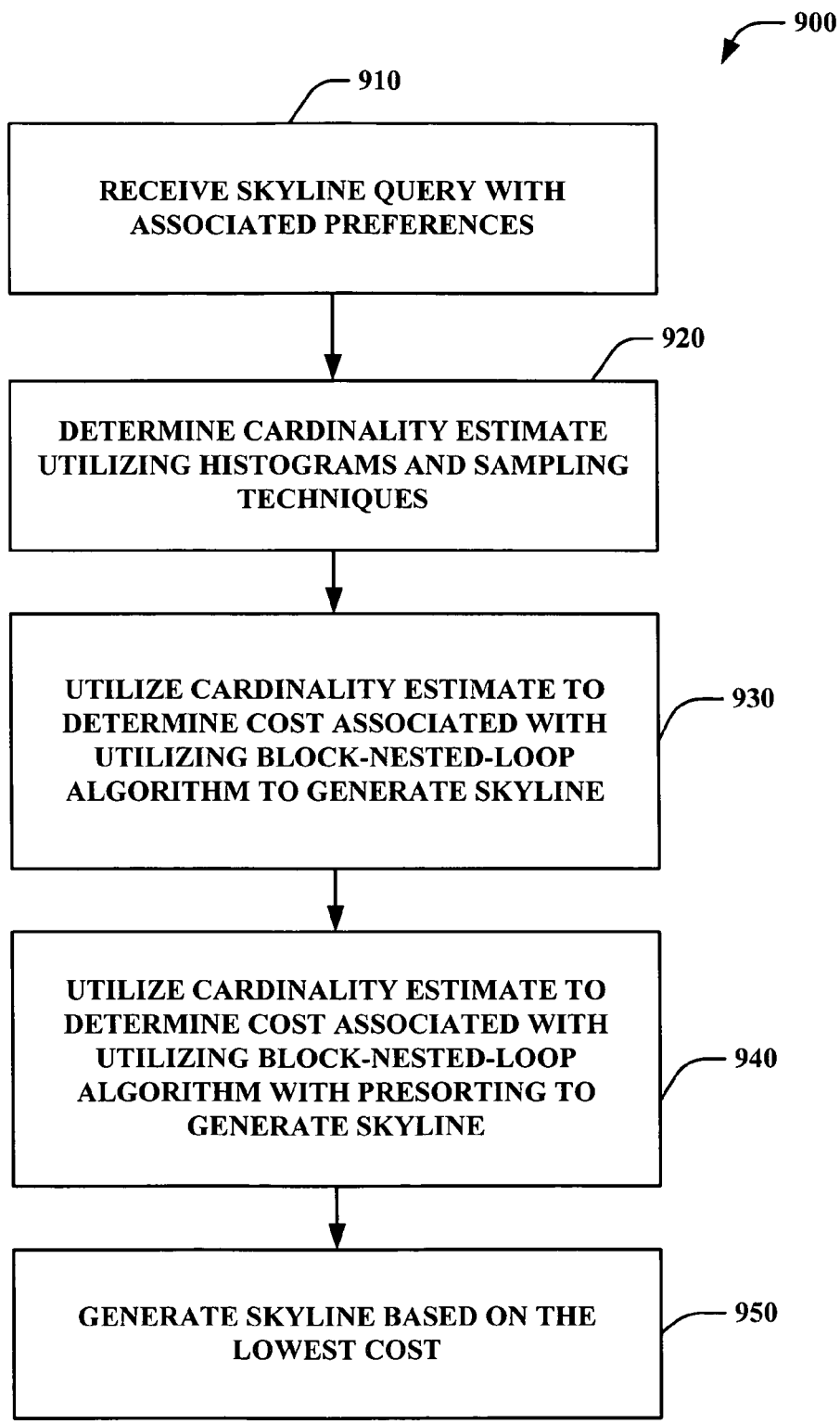
FIG. 9 illustrates another exemplary technique for generating a skyline.

With reference to FIGS. 7-9, therein are illustrated representative flow diagrams in accordance with aspects of the claimed subject matter. While, for purposes of simplicity of explanation, the one or more methodologies shown herein are shown and described as a series of acts, it is to be understood and appreciated that the claimed subject matter is not limited by the order of acts, as some acts may, in accordance with the claimed subject matter, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

With reference to FIG. 7, therein is illustrated a method 700 that can be utilized by the claimed subject matter to generate a skyline. At 710 the method receives a skyline query with associated preferences. At 720 a cardinality estimation is determined wherein the cardinality estimate is based at least in part on the utilization of one or more sampling technique. The result of the cardinality estimation is then conveyed to acts 730 and 740, whereupon at 730 the cardinality estimation determined at 720 is utilized to determine the costs associated with utilizing a Block-Nested-Loop (BNL) algorithm to generate the skyline. Similarly, at 740 the cardinality estimation determined at 720 is employed to determine the costs associated with using a Block-Nested-Loop algorithm with Presorting (SRT) to generate a skyline. At 750 a skyline is generated utilizing either the Block-Nested-Loop algorithm (BNL) or Block-Nested-Loop algorithm with Presorting (SRT). The determination as to which algorithm to employ to generate the skyline is based at least in part upon the lowest cost that is received from acts 730 and 740.

Turning to FIG. 8, depicts a method 800 for generating a skyline. At 810 a skyline query with associated preferences is received. At 820 a cardinality estimation is generated utilizing one or more histograms. The result of the cardinality estimation performed at 820 is subsequently passed to acts 830 and 840 respectively. At 830 the cardinality estimation propagated at 820 is employed to ascertain the costs associated with utilizing the Block-Nested-Loop algorithm (BNL) to generate a skyline. Similarly, at 840 the propagated cardinality estimation from act 820 is used to determine the costs associated with employing the Block-Nested-Loop algorithm with Presorting (SRT) to generate the skyline. At 850 the results conveyed by acts 830 and 840 are compared and a skyline is generated utilizing the algorithm that returned the lowest cost estimate at either 830 or 840.

With reference to FIG. 9, therein is illustrated a method 900 that can be employed in conjunction with the claimed subject matter. At 910 one or more skyline queries with associated preferences is received. At 920 a cardinality estimation is undertaken utilizing one or more histograms and one or more sampling techniques. The result of the cardinality estimation performed at 920 is subsequently distributed to acts 930 and 940 whereupon at 930 the cardinality estimation from 920 is utilized to ascertain the costs associated with using a Block-Nested-Loop algorithm (BNL) to generate a skyline. At 940 a similar determination is undertaken wherein the cardinality estimation generated at 920 is employed to determine the associated costs of utilizing a Block-Nested-Loop algorithm with Presorting (SRT) to generate one or more skylines reflective of the one ore more submitted skyline queries. At 950 a determination as to which of the algorithms to utilize is made in order to generate the one or more skylines to satisfy the one or more submitted skyline queries. The determination as to which algorithm to employ is based at least upon the lowest cost returned by acts 930 and 940.

Figure 10:
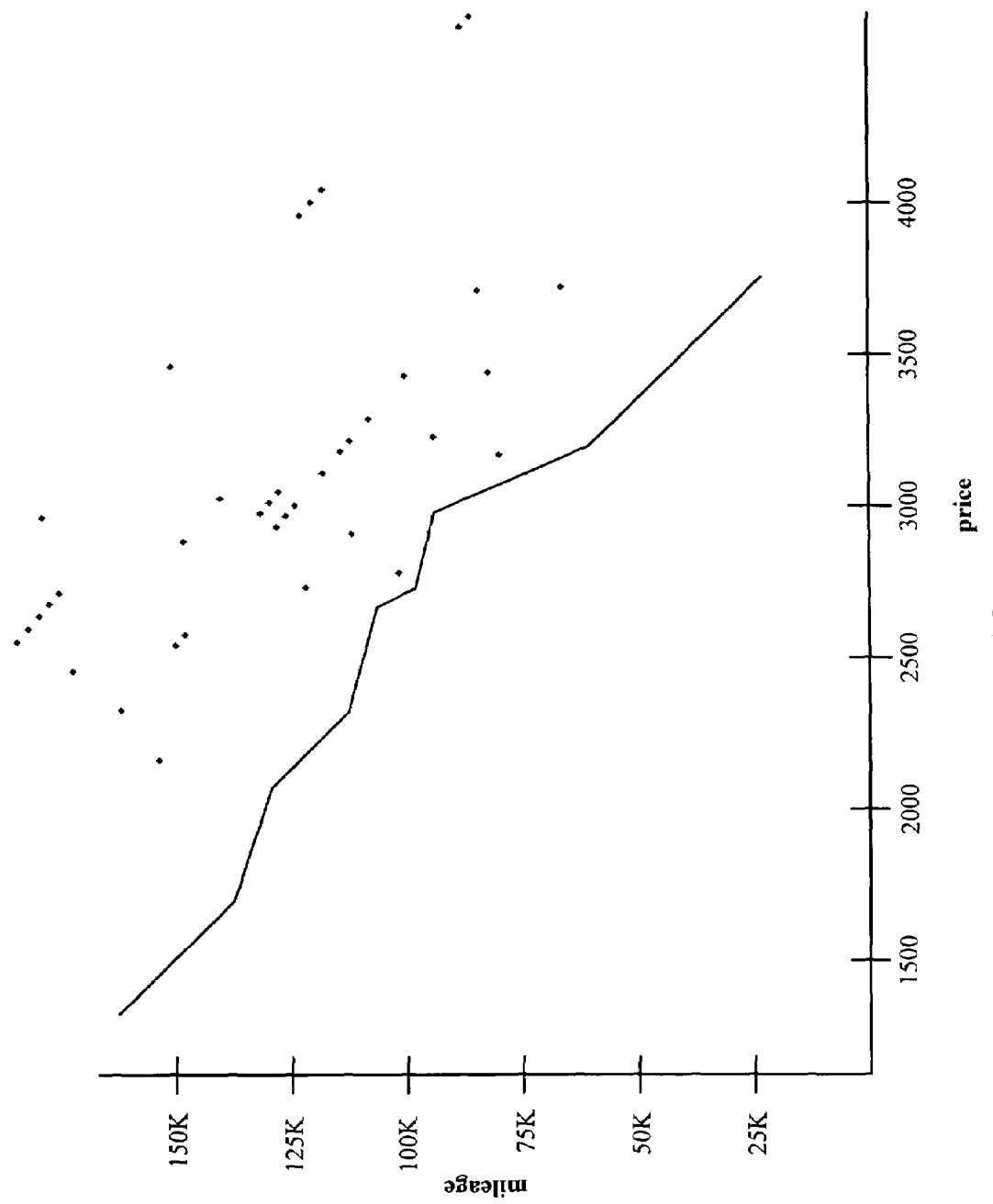
FIG. 10 illustrates an exemplary skyline generated in accordance with one aspect of the claimed subject matter.

Turning now to FIG. 10, therein is illustrated a resultant skyline of a query regarding the cheapest car with the lowest mileage. As can be seen there are data points dispersed to the right of the solid line that are representative of the skyline. These data points represent data points that are dominated in at least one of the two preferences by data points that rest on the skyline (the solid line). The skyline thus represents results for which there are no other results that are better with respect to all other data points.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Figure 11:
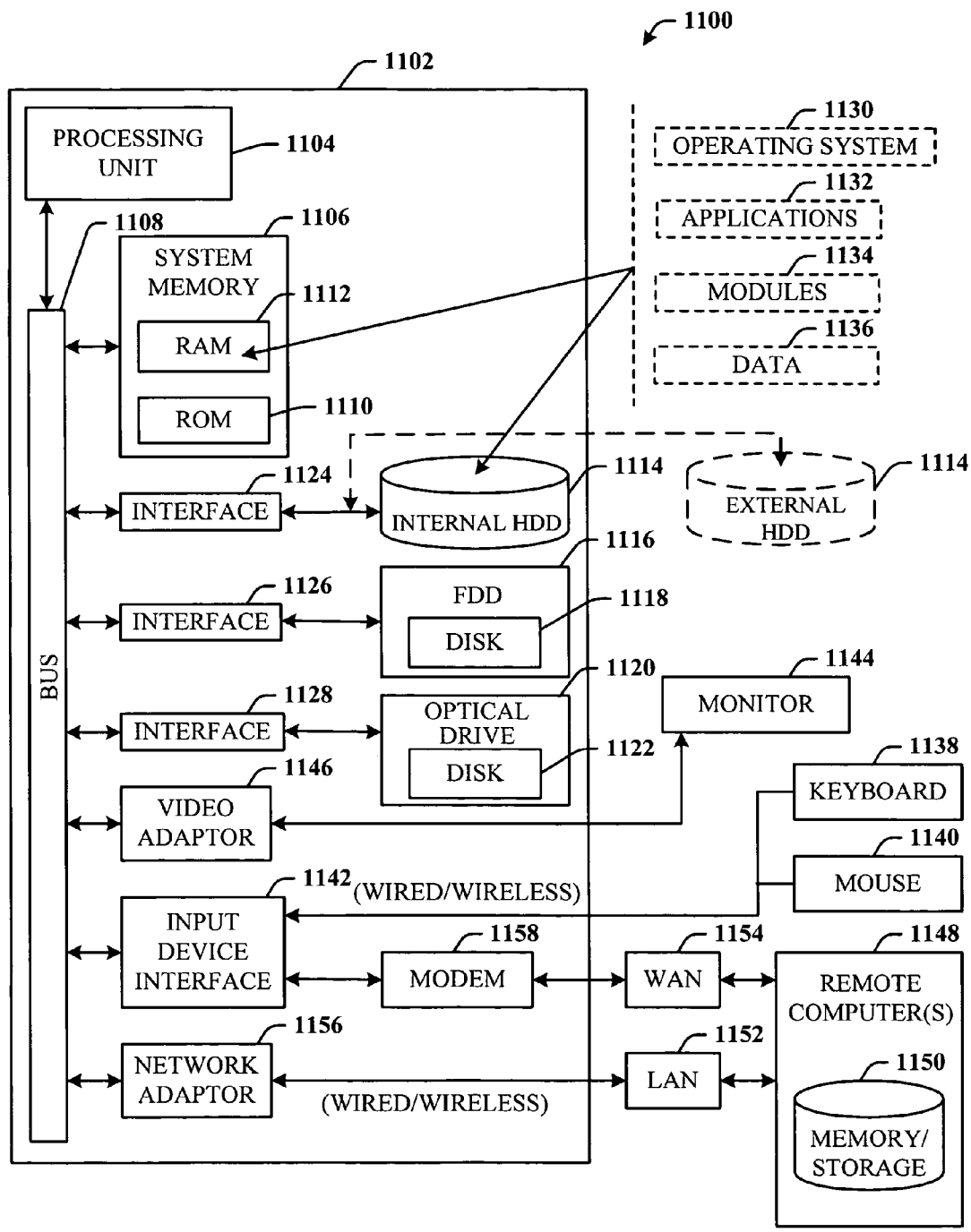
FIG. 11 illustrates a block diagram of a computer operable to execute the disclosed architecture.

With reference again to FIG. 11, there is illustrated an exemplary environment 1100 for implementing various aspects of the claimed subject matter that includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156. When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
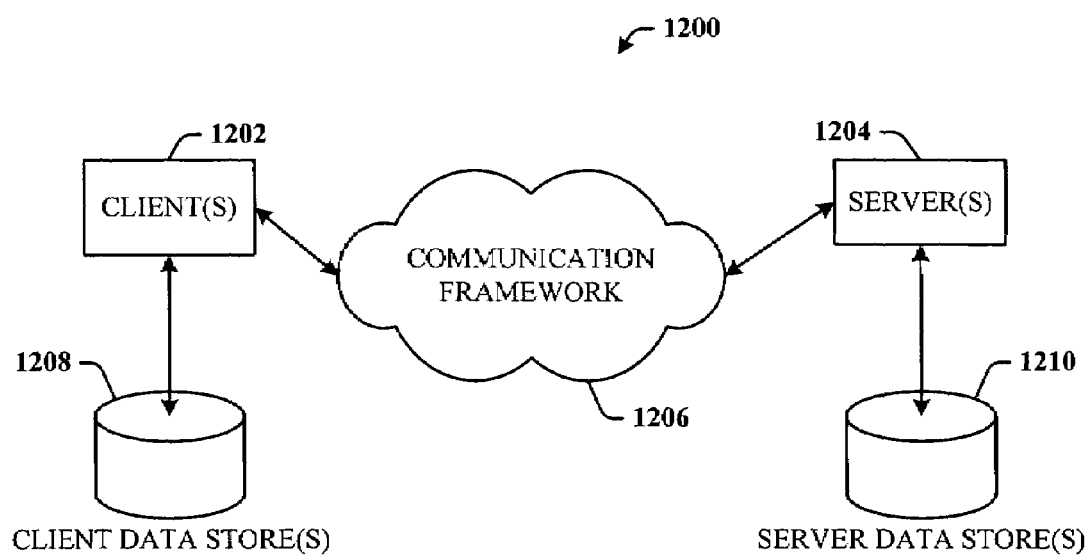
FIG. 12 illustrates a schematic block diagram of an exemplary computing environment.

Referring now to FIG. 12, there is illustrated a schematic block diagram of an exemplary computing environment 1200 in accordance with the claimed subject matter. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example. The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that generates a skyline that prioritizes data comprising:

one or more processors; and one or more memories communicatively coupled to the one or more processors, the one or more memories having stored instructions that, when executed, configure the system to implement:

an interface component that receives a query and at least one associated preference; and an optimization component communicatively coupled to the interface component that generates the skyline based at least in part on the received query and the at least one associated preference, wherein:

the optimization component further comprises comprising a cardinality estimation component that ascertains an estimated cardinality of the skyline; and the cardinality estimation component determines the estimated cardinality of the skyline based at least in part on $$n \sum \int_{[0,1]}^{d} P_1(v)(1 - P_2(v)x_1 \ldots x_d)^n dx_1 \ldots dx_d$$

where n represents a number of tuples, d represents a number of numeric preferences, $P_1(v)$ represents a probability that attributes $\{Y_1 \ldots Y_k\}$ have a value given as a vector v, and $P_2(v)$ represents a probability that attributes $\{Y_1 \ldots Y_k\}$ have a value less than or equal to the vector v, where $Y_i$ represents a predicate preference.

2. The system of claim 1, wherein the cardinality estimation component comprises:

a differentiation component that determines whether each of the one or more associated preferences are numeric and predicate; and an independence determination component that ascertains the interdependence of each of the at least one associated preference.

3. The system engine of claim 2, wherein the cardinality estimation component employs a random sampling technique to generate a cardinality prognostication for the skyline.

4. The system engine of claim 2, wherein the cardinality estimation component employs at least one histogram to produce an estimate of skyline cardinality.

5. The system engine of claim 2, wherein the cardinality estimation component utilizes at least a histogram and a sampling technique to generate an estimate of skyline cardinality.

6. The system of claim 1, the optimization component further comprising a cost estimation component that provides an estimation of at least one cost associated with generating the skyline.

7. The system of claim 6, wherein the cost estimation component determines the at least one cost associated with generating the skyline by utilizing a Block-Nested-Loop methodology and a Block-Nested-Loop methodology with Presorting.

8. The system of claim 6, wherein the cost estimation component ascertains the at least one cost associated with generating the skyline by employing a Block-Nested-Loop methodology and a Nearest Neighbor technique.

9. The system of claim 6, wherein the cost estimation component determines the at least one cost associated with generating the skyline by utilizing a Block-Nested-Loop methodology with Presorting and a Divide and Conquer methodology.

10. The system of claim 1, wherein the skyline generated is based on at least one of an estimated cardinality and an estimated cost of generating the skyline.

11. A machine-implemented method for generating a skyline that prioritizes data comprising:

receiving, by a computing system configured to provide database function, a query and one or more associated preferences;

ascertaining, by the computing system, a cardinality estimate based at least in part on $$n \sum \int_{[0,1]}^{d} P_1(v)(1 - P_2(v)x_1 \ldots x_d)^n dx_1 \ldots dx_d$$

where n represents a number of tuples, d represents a number of numeric preferences, $P_1(v)$ represents a probability that attributes $\{Y_1 \ldots Y_k\}$ have a value given as a vector v, and $P_2(v)$ represents a probability that attributes $\{Y_1 \ldots Y_k\}$ have a value less than or equal to the vector v, where $Y_i$ represents a predicate preference utilizing, by the computing system, the cardinality estimate to ascertain a cost associated with utilizing one or more techniques for generating the skyline; and selectively generating, by the computing system, the skyline based at least in part on the cost associated with utilizing the one or more techniques.

12. The method of claim 11, wherein the cardinality estimate is based at least in part on a determination regarding the interrelatedness of the one or more associated preferences.

13. The method of claim 11, wherein the cost associated with utilizing the one or more techniques is related to CPU utilization.

14. The method of claim 11, further comprising ascertaining, by the computing system, whether the one or more associated preferences are numeric and predicate.

15. The method of claim 11, wherein the one or more techniques include at least a Block-Nested-Loop algorithm and a Block-Nested-Loop algorithm with Presorting.

16. The method of claim 11, wherein the one or more techniques selected for generating the skyline are based at least on a lowest cost.

17. The method of claim 11, wherein the generation of the skyline is based at least in part on an estimated cardinality of generating the skyline.

18. A system that generates a skyline that prioritizes data, comprising:
    one or more processors; and
    one or more memories communicatively coupled to the one or more processors, the one or more memories having stored instructions that, when executed, configure the system to implement:
        means for receiving a query associated with at least one numeric preference and at least one predicate preference;
        means for determining a cardinality estimate based on the at least one numeric preference and the at least one predicate preference;
        means for ascertaining a cost of utilizing one or more skyline generating techniques based on the cardinality estimate; and
        means for generating the skyline based at least in part on the cost of utilizing the one or more skyline generating techniques, wherein:

the means for determining a cardinality estimate based on the at least one numeric preference and the at least one predicate preference further comprises determining the estimated cardinality of the skyline based at least in part on $$n \sum \int_{[0,1]}^d P_1(v)(1 - P_2(v)x_1 \ldots x_d)^n \, dx_1 \ldots dx_d$$

where n represents a number of tuples, d represents a number of numeric preferences, $P_1(v)$ represents a probability that attributes $\{Y_1 \ldots Y_k\}$ have a value given as a vector v, and $P_2(v)$ represents a probability that attributes $\{Y_1 \ldots Y_k\}$ have a value less than or equal to the vector v, where $Y_i$ represents a predicate preference.

19. The method of claim 11, wherein the one or more techniques include at least a Block-Nested-Loop methodology and a Nearest Neighbor technique.

20. The method of claim 11, wherein the one or more techniques include at least a Block-Nested-Loop methodology with Presorting and a Divide and Conquer methodology.

* * * * *

UNITED STATES PATENT AND TRADEMARK OFFICE
CERTIFICATE OF CORRECTION

| | |
|---|---|
| PATENT NO. | : 7,707,207 B2 |
| APPLICATION NO. | : 11/357665 |
| DATED | : April 27, 2010 |
| INVENTOR(S) | : Kaushik Shriraghav et al. |

It is certified that error appears in the above-identified patent and that said Letters Patent is hereby corrected as shown below:

In column 11, line 41, delete "ith" and insert -- $i^{th}$ --, therefor.

In column 22, line 22, in Claim 3, after "system" delete "engine".

In column 22, line 25, in Claim 4, after "system" delete "engine".

In column 22, line 28, in Claim 5, after "system" delete "engine".

Signed and Sealed this
Twenty-sixth Day of July, 2011

David J. Kappos
*Director of the United States Patent and Trademark Office*